United States Patent [19]

Lane

[11] Patent Number: 4,466,524
[45] Date of Patent: Aug. 21, 1984

[54] PLATE LOCATING APPARATUS FOR MULTIPLE DISC CLUTCH

[75] Inventor: Wendell C. Lane, Kendallville, Ind.

[73] Assignee: Dana Corporation, Toledo, Ohio

[21] Appl. No.: 361,296

[22] Filed: Mar. 24, 1982

[51] Int. Cl.³ .................. F16D 13/75; F16D 65/52
[52] U.S. Cl. ........................ 112/70.25; 192/70.28;
 192/111 A; 188/71.5
[58] Field of Search ............ 192/70.25, 70.28, 70.22,
 192/70.19, 111 A; 188/71.5

[56] References Cited

U.S. PATENT DOCUMENTS

| | | | |
|---|---|---|---|
| 2,204,807 | 6/1940 | McCune et al. | 188/71.5 X |
| 2,218,616 | 10/1940 | McCune et al. | 188/71.5 X |
| 2,238,943 | 4/1941 | McCune et al. | 188/71.5 X |
| 2,349,132 | 5/1944 | Baird | 192/111 A |
| 2,981,376 | 4/1961 | Ziedler | 188/71.5 |
| 3,175,664 | 3/1965 | Ramsel | 192/70.28 |
| 3,202,247 | 8/1965 | Schmidt et al. | 192/111 A X |
| 3,228,501 | 1/1966 | Eason et al. | 192/70.2 |
| 3,360,089 | 8/1967 | Cockerill et al. | 192/111 A |
| 3,584,720 | 6/1971 | Bark et al. | 192/70.28 |
| 3,618,714 | 11/1971 | Croswell | 188/71.8 |
| 3,797,622 | 3/1974 | Worner et al. | 192/111 A |

Primary Examiner—Rodney H. Bonck
Assistant Examiner—David D. House
Attorney, Agent, or Firm—Frank B. McDonald

[57] ABSTRACT

A plate locating apparatus for a multiple disc clutch provides a mechanism for axially locating a plurality of intermediate plates relative to the discs interleaved therebetween, and thus insures that the respective intermediate plates and discs will be separated whenever the clutch is disengaged, for example, during the idling of an associated vehicle. In a preferred embodiment, the apparatus is defined by an axially extending rod affixed to the clutch cover, the rod extending through concentrically aligned apertures in the intermediate plates. A plurality of cylindrical sleeves are piloted on the rod, each sleeve extending through the aperture of one intermediate plate. Each sleeve contains abutment means at opposite ends thereof which are disposed for contacting the respective sides of an associated intermediate plate. A one-way frictional gripping mechanism is provided on the internal bore of each sleeve to prevent movement of the sleeve in one direction along the rod, but to otherwise permit the sleeve to move along the rod in the opposite direction.

16 Claims, 5 Drawing Figures

PLATE LOCATING APPARATUS FOR MULTIPLE DISC CLUTCH

BACKGROUND OF THE INVENTION

The present invention relates generally to multiple disc clutches which, as a major advantage over single disc clutches, have an inherent capacity for achieving greater frictional contact area per given disc diameter. This is because in multiple disc clutches the number of discs, rather than disc size, may be increased for handling greater clutch loads. More particularly the invention relates to friction clutches of the type comprising a set of driving clutch plates and a set of driven clutch discs, the plates and discs being interleaved together in alternating relationship along a common axis. Such multiple disc clutches are extensively used in heavy duty service, such as in large tractors, heavy trucks, earth moving machinery, and military tanks.

Multiple disc clutches are usually engaged by the exertion of an axial thrust against one end of the assembly or pack of clutch plates and discs. The latter thrust operates to compress the driving plates and driven discs together into firm frictional engagement. The clutch is generally released by the action of spring energy, which is arranged to allow the clutch plates and discs to separate when the aforesaid axial thrust is released.

Heretofore associated with the releasing of such clutches has been a "dragging" of some of the clutch plates with some of the friction discs, caused by failure of one or more of the clutch plates to separate from associated discs when the clutch is disengaged. This problem, when severe, has resulted in overheating of the clutch, excessive wear of the friction surfaces, and poor synchronization of associated transmission gears.

The problem is particularly acute in "wet" type clutches, which contain discs and plates contacting one another in an environment of oil. In such environments, whenever the clutch pressure plate is drawn back to disengage the clutch, the rotatable pack of interleaved discs and plates tends to adhere or stick together and be drawn away from the flywheel without separation between them. The resulting continued contact between discs and plates during idle periods of clutch disengagement generates an undesirable residual moment which in turn results in the aforementioned disadvantages.

Several attempts to provide apparatus which automatically separates the driven clutch discs from the driving clutch plates upon clutch release have resulted in equipment either less than satisfactory, or relatively expensive to manufacture. Moreover, many of such attempts have resulted in apparatus which has failed to positively restore or relocate both sets of discs and plates back into original positions, or to positively retain them in positions of idle for avoiding all frictional contact or drag between the plates and discs. Thus, an improved apparatus is needed which will positively retain both sets of discs and plates in desired positions throughout the entire idling operation of the clutch. Such a clutch would possess the attributes of improved wear of the friction surfaces, improved synchronization, and commensurately easier gear shifting.

SUMMARY OF THE INVENTION

The invention disclosed herein provides an improved plate locating apparatus for multiple disc clutches. The apparatus provides an automatically operating mechanism which will separate the driven clutch discs from the diving clutch plates in a manner which insures positive retention for avoiding frictional contact or drag between the plates during the idling phases of such clutches. The apparatus results in improved gear shifting, and compensates automatically for wear of the friction discs. A preferred embodiment of the apparatus includes an axially extending rod fixed to the clutch cover, and extending through a plurality of aligned apertures in the intermediate plates of the clutch. A plurality of cylindrical sleeves are piloted on the rod, each sleeve extending through one aperture. Each sleeve contains abutment means at opposite ends thereof which are disposed for contacting respective sides of an associated intermediate plate. The internal bore of each sleeve contains a one-way gripping mechanism to restrict the sleeve to movement along the rod in one direction only.

DETAILED DESCRIPTION OF THE PREFERRED EMBODIMENTS

Figure 1:
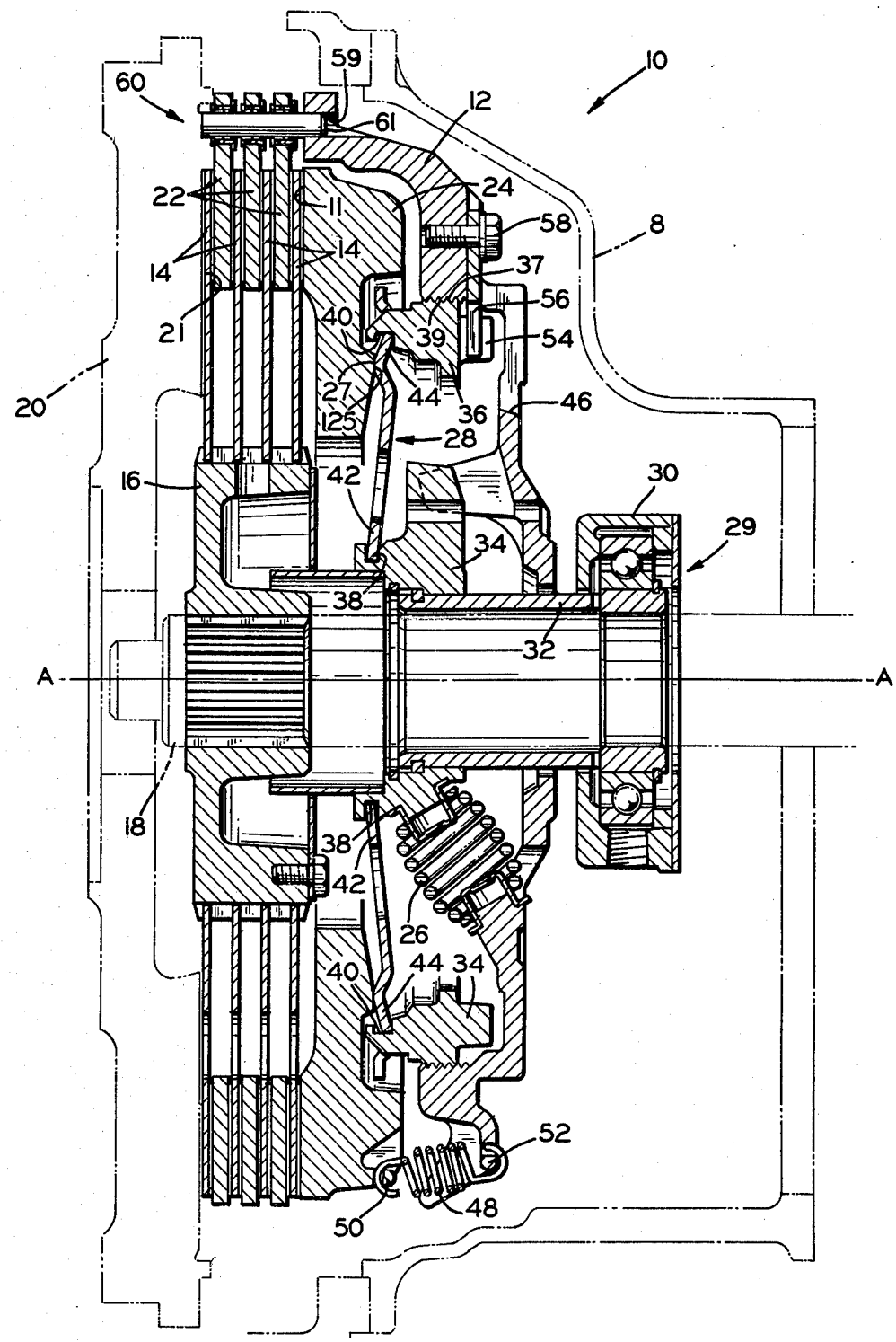
FIG. 1 is a fragmentary sectional view of a multiple disc clutch which incorporates a preferred embodiment of the plate locating apparatus of this invention.

Referring now to the drawings, a multiple disc clutch 10 containing a preferred embodiment of this invention is shown fragmentarily in FIG. 1. The clutch 10 includes a housing 8 permanently affixed to a vehicular structure (not shown). Contained within the housing 8 are rotatable driving and driven elements 20 and 16 respectively, concentrically mounted for rotation about an axis AA. The rotatable driving element is more particularly defined by a flywheel 20 attached to the rearward end of an engine crankshaft (not shown). Fixed to the flywheel for rotation therewith are a cover 12 and a plurality of intermediate plates 22. The intermediate plates 22 are free to move axially, but nonrotatably with respect to the cover and flywheel members. Interleaved between the intermediate plates 22 are a plurality of driven discs 14, which are each mounted to the rotatable driven element embodied herein as a driven hub 16. The discs 14 are axially movable on the hub 16, but nonrotatable relative thereto. Thus, the intermediate plates 22 are externally splined for axial nonrotatable movement relative to the cover 12, while the driven discs 14 are internally splined for axial, but nonrotatable movement on external splines of the driven hub 16. The driven hub 16 is in turn keyed to a driven clutch shaft 18, the latter shaft having its forward or leftward end piloted in the aforesaid rearward end of the crankshaft.

It may thus be appreciated that the cover 12 is affixed to the flywheel 20 for rotation therewith, the cover 12 thus sandwiching the axially movable plates 22 and discs 14 of the clutch 10. In a normally engaged position of the clutch 10, a pressure plate 24 is urged leftwardly by a plurality of pressure springs 26 spaced evenly about the axis AA. The interleaved sets of plates and discs are thereby frictionally urged together between the flywheel 20 and the pressure plate 24 under force of the pressure springs 26. Per standard clutch practice, each disc contains friction facings on both of its engaging faces, which ensures against slippage between the discs and plates under normal vehicular load.

A standard clutch release mechanism 29 is employed for effecting clutch disengagement. The mechanism includes a clutch release bearing 30 affixed to a bearing sleeve 32. Fixedly mounted to the bearing sleeve 32 for axial movement therewith is a release bearing collar 34 which engages the plurality of pressure springs 26. As the pressure springs 26 are interposed between the clutch cover 12 and the release bearing collar 34, rightward movement of the clutch release bearing 30 will effect a like rightward movement of the release bearing collar 34 against the force of the pressure springs 26. Such movement of the clutch release bearing 30 is generally achieved by the depression of a clutch pedal in a vehicular cab (not shown).

As will be apparent, rightward movement of the release bearing collar 34 will effect righward movement of the inner end 42 of a plurality of levers 28. The release bearing collar 34 contains an external groove 38 which pivotally engages the inner end 42 of each lever 28. An adjusting ring 36 secured to the clutch cover 12 contains an internal groove 40 for pivotal engagement of the outer end 44 of each corresponding lever. Intermediate the lever ends 42 and 44 is a lever pressure point 27 which engages a pressure plate nose 125 on the rearward side of the pressure plate 24. As the adjusting ring 36 is axially, but adjustably, fixed relative to the clutch collar 34, it will be seen that the lever pressure point 27 will move rightwardly upon rightward movement of the collar 34. As pressure is thereby relieved from the nose 25 of the pressure plate 24, the pressure plate will be pulled rightwardly by a plurality of pressure plate release springs 48, each of which engages a pressure spring lug 50 and a cover spring lug 52 on the pressure plate 24 and the cover 12, respectively.

The aforementioned adjusting ring 36 is axially but adjustably secured to the cover 12 as noted by external threads 37 thereon which engage internal threads 39 of the cover 12. A plurality of adjusting ring tabs 54 are accessible through an access opening 46 in the cover 12. The tabs are aligned radially with respect to the axis AA, each tab being positioned at the same radial distance outwardly of the latter axis, and thus circumferentially disposed about the annular adjusting ring 36. As they are closely spaced, each tab is essentially parallel to the tabs on either side thereof. An adjusting ring locking key 56 is inserted radially through the access opening 46 between a pair of such tabs 54 to maintain or hold a desired position of the adjusting ring 36. The key 56 is fixed in position by locking key bolt 58.

The multiple disc clutch 10, as aforedescribed, is but one example of many clutches suitable for incorporation of this invention. Thus numerous types and styles of such clutches may be amenable for the specific plate locating apparatus 60 of this invention, now to be described in particular detail.

Figure 2:
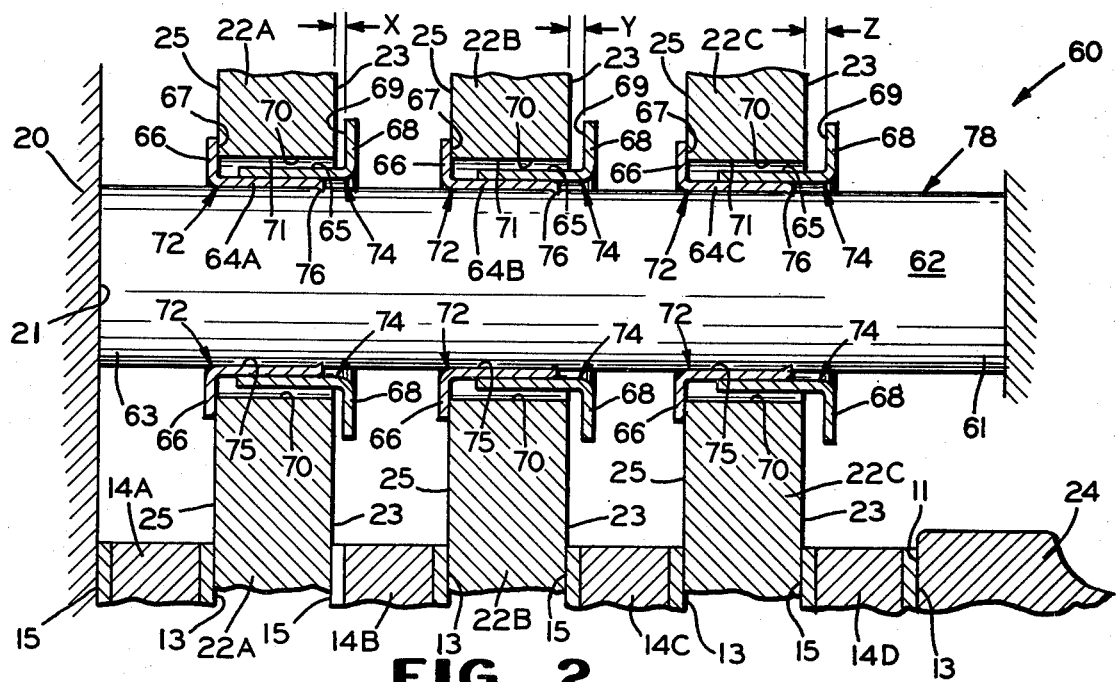
FIG. 2 is an enlarged fragmentary sectional view of the plate locating apparatus as depicted in FIG. 1.

A first preferred embodiment 60 of the plate locating apparatus of this invention is shown more particularly in FIG. 2. The apparatus includes a locator rod 62 having an end 61 affixed within a cover pilot opening 59 of the cover 12 (FIG. 1). The opposite end 63 of the locator rod 62 abuts a flywheel friction surface 21 of the flywheel 20. A plurality of cylindrical sleeves 64 (pluralities of identical elements hereindescribed are identified with suffixes A, B, C, etc.), are piloted on the locator rod 62, each sleeve 64 extending through an aperture 70 of one of the intermediate plates 22. Each sleeve includes an external wall 65 radially spaced from the internal walls 71 of each aperture 70 in an associated intermediate plate 22. The resulting annular space allows each sleeve 64 to move freely in an axial direction within its associated aperture 70. Each sleeve 64 includes a forward flange 66 and a rearward flange 68, the flanges containing intermediate plate contacting surfaces 67 and 69, respectively. The flanges 66 and 68 of each sleeve 64 are spaced apart a distance greater than the width of the intermediate plate 22 associated with that sleeve, as will be further explained hereinbelow.

Each sleeve 64 also includes an internal bore 75, which contains provisions for frictionally engaging the rod 62 for restriction of axial movement of the sleeve relative to the rod in one direction only. Thus, in the first preferred embodiment 60 of FIG. 2, an annular engaging lip 76 extends radially inwardly, but has an axially directed component in the direction away from the flywheel 20. As a result, whenever a sleeve 64 is forced by its associated intermediate plate 22 in a direction rearwardly or away from the flywheel 20, the lip 76 will prevent the sleeve from sliding along the rod in that direction. On the other hand, when the sleeve is urged leftwardly or toward the flywheel 20, the sleeve will under a relatively small force, be moved leftwardly along the rod 62.

The sleeve of the first preferred embodiment 60 includes a pair of cup-shaped half portions; more specifically, a forward portion 72 and a rearward portion 74 which are press-fitted together. It will be noted that only the front or forward cup-shaped half portion 72 contacts the external surface 78 of the rod 62, and the latter portion also contains the inwardly rolled engaging lip 76. Alternatively, the lip 76 may comprise at least two radially inwardly extending tangs in lieu of the described embodiment having a circumferentially continuous lip. Either embodiment would appear in cross section as shown in FIG. 2, however.

In the preferred embodiment 60, the rod 62 is preferably made of a nylon or a tetrafluoroethylene, although any workable materials will suffice, for example, even temperature resistant plastics or soft metals. The preferred sleeve 64, on the other hand, is made of a harder material; preferably of a spring steel.

The operation of the plate locating apparatus of this invention may now be more particularly described as follows.

Referring to both FIGS. 1 and 2, leftward movement of the pressure plate 24 will result in a positive engagement of the clutch, whereby the interleaved clusters of driven discs 14 and intermediate plates 22 will be urged together between the friction surface 21 of the flywheel 20 and the forward face 11 of the pressure plate 24. As the intermediate plates 22 are moved leftwardly, the forward faces 25 thereof will contact the intermediate plate contacting surfaces 67 of the forward flanges 66 of the sleeves 64. The resulting action will collectively slide the sleeves 64 leftwardly along the locator rod 62, as the rolled engaging lips 76 are ineffective to prevent movement of the sleeves along the rod 62 in the latter direction. In the full clutch engaged position as shown in FIG. 1, each sleeve will then have bottomed out in a relative position along the rod 62 as shown in FIG. 2.

As the friction facings (not shown) on each disc 14 begin to wear, the interleaved clusters of friction discs 14 and intermediate plates 22 will shift even further leftwardly toward the flywheel 20. The sleeves 64 will thereby be shifted leftwardly to automatically compensate for the additional leftward displacement of the intermediate plates.

Upon clutch release, the pressure plate 24 will be pulled rightwardly away from the pack of driven discs 14 and intermediate plates 22 as aforedescribed. As earlier noted, there is a tendency for the latter pack of relatively rotatable elements to be drawn rearwardly with the pressure plate 24 during disengagement, resulting in unsatisfactory separation between the respective discs and plates. The plate locating apparatus 60 will effect a positive separation of discs and plates upon clutch disengagement, however. Thus, as each intermediate plate 22 moves rearwardly or away from the flywheel 20, the rearward face 23 thereof will contact the intermediate plate contacting surface 69 of the rearward flange 68, and the intermediate plate 22 will be thereby restrained against further rearward travel. The engaging lips 76 of the sleeves 64 will insure that the sleeves 64 do not move rearwardly, and thus oil adhesion forces between plates and discs will be broken. The apparatus 60 will thus provide a positive separation between the forward faces 15 of discs 14 and the rearward faces 23 of the intermediate plates 22. At the same time, separation between rearward faces 13 of discs 14 and forward faces 25 of intermediate plate 22 will be satisfactorily effected by the inherent vibration of the clutch parts. The intermediate plates 22 will be free therefore to float between the forward and the rearward flanges 66 and 68.

It will be appreciated by those skilled in the art that the respective sleeves 64a, 64b, and 64c must have varying spacing between their forward and rearward flanges 66 and 68 in order to ensure relatively even spacing between all discs and plates upon clutch disengagement. Ideally, a desired clearance between each adjacent disc and plate upon full disengagement is approximately 0.020 inch. During disengagement, the separation distances between the plates and flanges of the respective sleeves become cumulative as measured from the flywheel, an axially fixed point of reference relative to all axial movements of discs, plates, and sleeves. As a result, the sleeves must be sized so that the distance X between the rearward face 23 of intermediate plate 22a and the intermediate plate contacting surface 69 of the rearward flange 68 of the sleeve 64a will be smaller than the distance Y between like members associated with the sleeve 64b and the intermediate plate 22b. (All of such distances are, of course, measured with the contacting surfaces 67 of the forward flanges 66 against the forward faces 25 of the intermediate plates 22 as shown in FIG. 2.) Correspondingly, the distance Z will be greater than the distance Y. For example, utilizing 0.020 inch as a desired full disengagement clearance between each plate 22 and disc 14, as well as between the flywheel 20 and disc 14A, and between disc 14D and pressure plate 24, the distance X would equal 0.040 inch, or the cummulative total of distances between (1) the flywheel 20 and disc 14A, and (2) the disc 14A and plate 22A. The distance Y would then equal twice this amount, or 0.080 inch, representing the distance X, plus the additional distances between (1) the plate 22A and disc 14B, and (2) the disc 14B and plate 22B. The distance Z would equal 0.120 inch, or the distance Y plus the additional distances between (1) plate 22B and disc 14C, and (2) disc 14C and plate 22C. It follows that for a desired clearance equal to "N" between adjacent discs and plates upon full disengagement, X would equal 2N, Y would equal 4N, and Z would equal 6N.

Thus, the embodiment 60 of the plate locating apparatus of this invention provides a means by which intermediate plates may be reliably and positively separated by predetermined clearances from their cooperating friction discs during all periods of clutch disengagement or idle.

The apparatus will thereby accurately locate each of the axially shiftable intermediate plates with respect to the clutch plates, whereby all clutch plates may be equidistantly spaced apart during the entire idling rotation of the clutch.

Figure 3:
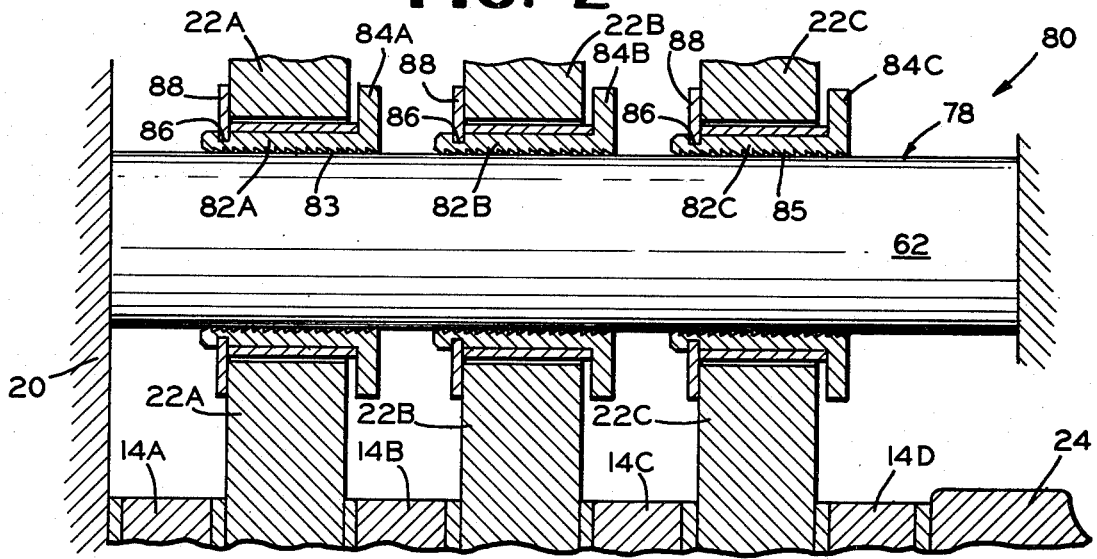
FIG. 3 is an enlarged fragmentary sectional view of a second preferred embodiment of the plate locating apparatus of this invention.

Several other variations of this invention are envisioned hereunder. For example, another preferred embodiment of the locator apparatus 80 is shown in FIG. 3. The locator rod 62 is identical to and performs the same function as in the embodiment 60 of FIG. 2. However, a different embodiment of a sleeve 82 is employed, the sleeve 82 having an internal bore 83 including a plurality of projections 85. The latter projections are aligned rearwardly for gripping the external surface 78 of the rod 62 in the rearward direction only. The plurality of projections 85 defines an internal bore 83 having a serrated configuration as shown. Alternatively, the serrations could be included in the rod, as opposed to the bore, for achieving the same gripping effect; and this invention is not to be so limited. The sleeve 82 includes an integral flange 84, which, in the preferred embodiment shown in FIG. 3, is a rearward flange but could alternatively be a forward flange. At the forward portion of the sleeve 82 is an annular groove 86 for receiving a snap ring 88 which acts as a counterpart of the forward flange 66 of the embodiment 60 in FIG. 2.

The sleeve 82 in the preferred embodiment is made of a relatively hard, temperature resistant plastic, although the sleeves could alternatively be made of some type of steel. The preferred rod 62 is of nylon or tetrafluoroethylene, as in the first preferred embodiment 60, however.

Figure 4:
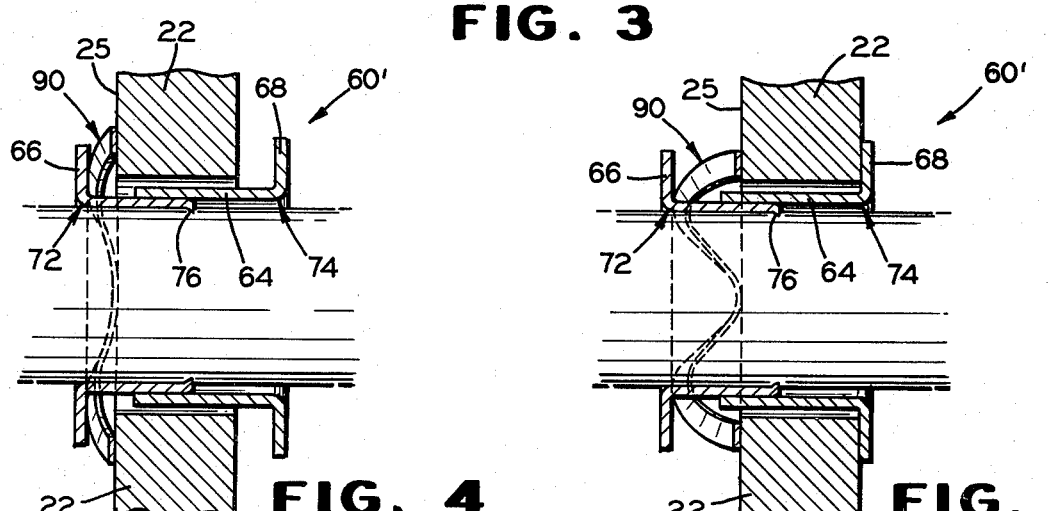
FIG. 4 is an enlarged fragmentary sectional view of a portion of a still third embodiment of the plate locating apparatus of this invention as shown in an engaged position of an associated clutch.
Figure 5:
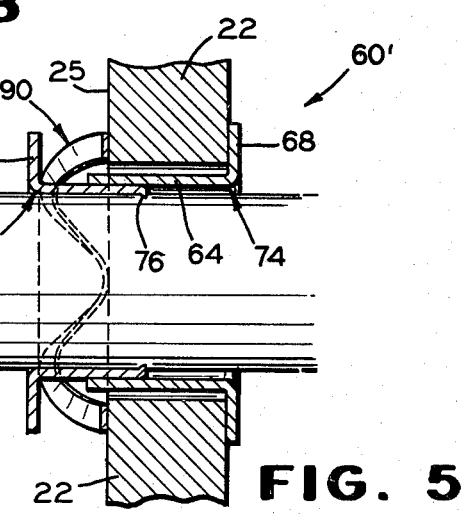
FIG. 5 is a view of the embodiment of FIG. 4 shown in a disengaged position of same clutch.

FIGS. 4 and 5 depict a third preferred embodiment 60' which is a modification of the first preferred embodiment 60. Thus, for example, it is envisioned that in some applications a positive force might be desirable for holding the intermediate plate 22 against the rearward flange 68 during the clutch disengaged position. Such a force might be provided by means of a spring, for example, in the form of a wave washer 90 between the forward flange 66 of the sleeve 64 and the forward face 25 of the intermediate plate 22. As will be appreciated by those skilled in the art, however, such a spring force must be sufficiently light so as to avoid urging the sleeves 64 along the locator rod in the direction of the flywheel 20.

What is claimed is:

1. In a clutch assembly including an intermediate plate, a cover, and a pressure plate disposed therebetween, a driven disc between said pressure plate and said intermediate plate, said intermediate plate containing an aperture therethrough, said aperture positioned radially outwardly of said driven disc; means for axially locating said intermediate plate relative to said driven disc, comprising: (a) an axially extending rod having one end thereof affixed to said cover, said rod extending through said aperture, (b) a cylindrical sleeve piloted on said rod and extending through said aperture, said sleeve containing abutment means at opposite ends thereof, said abutment means being disposed for contacting respective sides of said intermediate plate; and (c) means on said sleeve for engaging said rod to restrict axial movement of said sleeve relative to said rod to one direction only.

2. The clutch assembly of claim 1 wherein said means on said sleeve for engaging said rod comprises radially inwardly extending tangs on an internal bore of said sleeve, each of said tangs also extending axially in a direction against which movement of said sleeve along said rod is prevented.

3. The clutch assembly of claim 1 wherein said means on said sleeve for frictionally engaging said rod comprises a circumferentially extending, radially inwardly extending, lip on an internal bore of said sleeve for gripping said rod in one axial direction only; said lip being angularly disposed in said one axial direction.

4. The clutch assembly of claim 1 wherein said means on said sleeve for engaging said rod comprises a plurality of circumferentially disposed, radially inwardly extending, serrations along an internal bore of said sleeve, the serrations extending angularly in one axial direction along said rod; whereby said sleeve is restricted from axial movement along said one direction relative to said rod.

5. The clutch assembly of claims 2, 3, or 4 further comprising a driven member to which said cover is affixed, wherein the opposite end of said rod relative to said end fixed to said cover is disposed for contact with said driven member.

6. The clutch assembly of claim 5 wherein said abutment means comprises radially extending flanges, each flange containing a surface disposed for contacting said respective sides of said intermediate plate, said surfaces being axially spaced a distance greater than the width of the intermediate plate.

7. The clutch assembly of claim 6, wherein said sleeve contains an annular groove, and wherein one of said flanges on said sleeve is a snap ring in engagement with said groove.

8. The clutch assembly of claim 6 wherein spring means are interposed between one of said two flanges on said sleeve and said intermediate plate, said means urging said intermediate plate against the second of said two flanges on said sleeve.

9. An apparatus for axially locating at least one intermediate plate relative to a driven disc in a multiple disc clutch, said clutch including a cover, a driven disc between said pressure plate and said one intermediate plate, said intermediate plate containing an aperture therethrough; said apparatus comprising: (a) a rod having one end thereof affixed to said cover, said rod extending axially through said aperture, (b) a cylindrical sleeve piloted on said rod and also extending through said aperture, said sleeve containing abutment means at opposite ends thereof, said abutment means being disposed for contacting respective sides of said intermediate plate; and (c) means on said sleeve for engaging said rod to restrict axial movement of said rod relative to said sleeve to one direction only.

10. The apparatus of claim 9 wherein said means on said sleeve for engaging said rod comprises radially inwardly extending tangs on an internal bore of said sleeve, each of said tangs also extending axially in a direction against which movement of said sleeve along said rod is prevented.

11. The apparatus of claim 9 wherein said means on said sleeve for frictionally engaging said rod comprises a circumferentially extending, radially inwardly extending, lip on an internal bore of said sleeve for gripping said rod in one axial direction only; said lip being angularly disposed in said one axial direction.

12. The apparatus of claim 9 wherein said means on said sleeve for engaging said rod comprises a plurality of circumferentially disposed, radially inwardly extending, serrations along an internal bore of said sleeve, the serrations extending angularly in one axial direction along said rod; whereby said sleeve is restricted from axial movement along said one direction relative to said rod.

13. The apparatus of claim 10, 11, or 12 further comprising a driven member to which said cover is affixed, wherein the opposite end of said rod relative to said end affixed to said cover is disposed for contact with said driven member.

14. The apparatus of claim 13 wherein said abutment means comprises radially extending flanges, each flange containing a surface disposed for contacting said respective sides of said intermediate plate, said surfaces being axially spaced a distance greater than the width of the intermediate plate.

15. The apparatus of claim 14 wherein said sleeve contains an annular groove, and wherein one of said flanges on said sleeve is a snap ring in engagement with said groove.

16. The apparatus of claim 14 wherein spring means are interposed between one of said two flanges on said sleeve and said intermediate plate, said means urging said intermediate plate against the second of said two flanges on said sleeve.

* * * * *